June 16, 1959 J. S. ATTINELLO 2,890,843
BOUNDARY LAYER CONTROL SYSTEM FOR AIRCRAFT
Filed Dec. 11, 1953 3 Sheets-Sheet 2

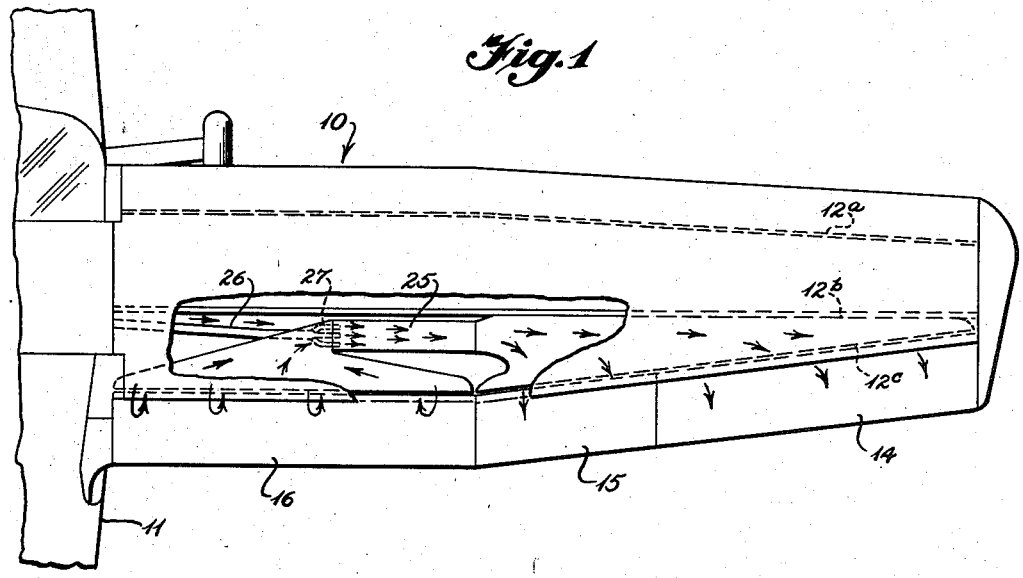
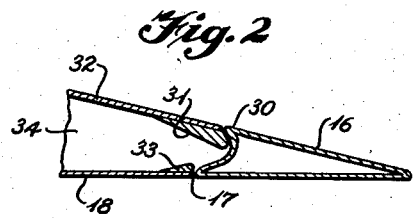
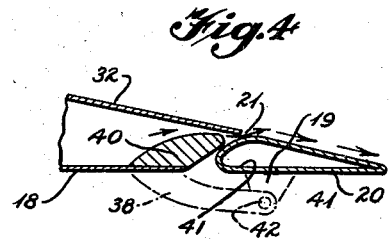
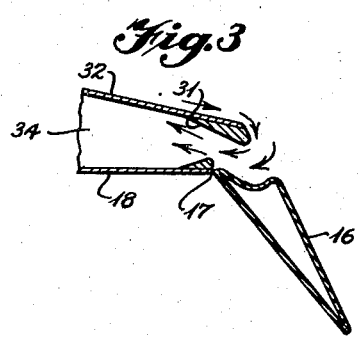
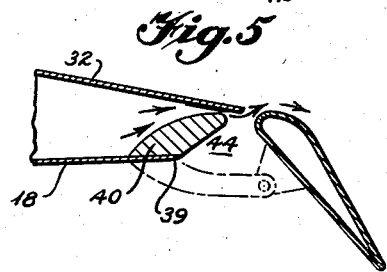

INVENTOR
John S. Attinello
BY
ATTORNEYS

June 16, 1959   J. S. ATTINELLO   2,890,843
BOUNDARY LAYER CONTROL SYSTEM FOR AIRCRAFT
Filed Dec. 11, 1953   3 Sheets-Sheet 3

INVENTOR
John S. Attinello
BY
ATTORNEYS

2,890,843

BOUNDARY LAYER CONTROL SYSTEM FOR AIRCRAFT

John S. Attinello, Falls Church, Va.

Application December 11, 1953, Serial No. 397,796

2 Claims. (Cl. 244—42)

(Granted under Title 35, U.S. Code (1952), sec. 266)

This invention relates to airplanes with special reference to boundary-layer control for increasing the wing lift coefficient during take-off and landing.

In take-off and landing of aircraft it is desirable that the normal lift be increased in order to permit lower speed landing and reduction in length of landing field. Many devices are in use for this purpose and others have been proposed which are not in general use due to difficulties in utilization. Use of wing flaps is one method of control; and modification of the air boundary layer to prevent separation of the layer and reduce drag is also used. Defects of the prior methods of boundary control lie in inadequate power supply resulting in insufficient volume of airflow, in inadequate lift coefficient or excessive drag coefficient, or, in a particular case, in extreme hazard in use, reference being made to the use of hydrogen peroxide as a jet pump for control of the air boundary layer and influencing the circulation about airfoil.

Accordingly, an important object of the invention is to provide a system of efficient boundary surface layer control which may be safely used on full-scale aircraft. Another object is to provide a chemical substance usable in a jet pump and possessing sufficient energy output to produce adequate boundary layer control. Still another object is to provide apparatus which may be used effectively to supply power fluid for a jet pump use.

An object also is to provide an effective lift control combining the wing flap with appropriate air boundary layer control. Correlative objects are to reduce take-off and land distances, to reduce stalling speed and increase climb angle and to accomplish the named objects without unusual design modifications or compromise in the structural integrity of the plane. Other objects and many of the attendant advantages of this invention will be readily appreciated as the same becomes better understood by reference to the following description and in connection with the accompanying drawings, in which:

Fig. 1 is an enlarged plan view of an airplane wing with parts broken away to show the air flow;

Fig. 2 is a sectional detail showing the suction aileron flap in neutral position;

Fig. 3 is a view similar to Fig. 2 but with the flap lowered;

Fig. 4 is a detail showing the aileron and blow flap relationship;

Fig. 5 is a view of the flap of Fig. 4 in lowered position;

Figure 6:
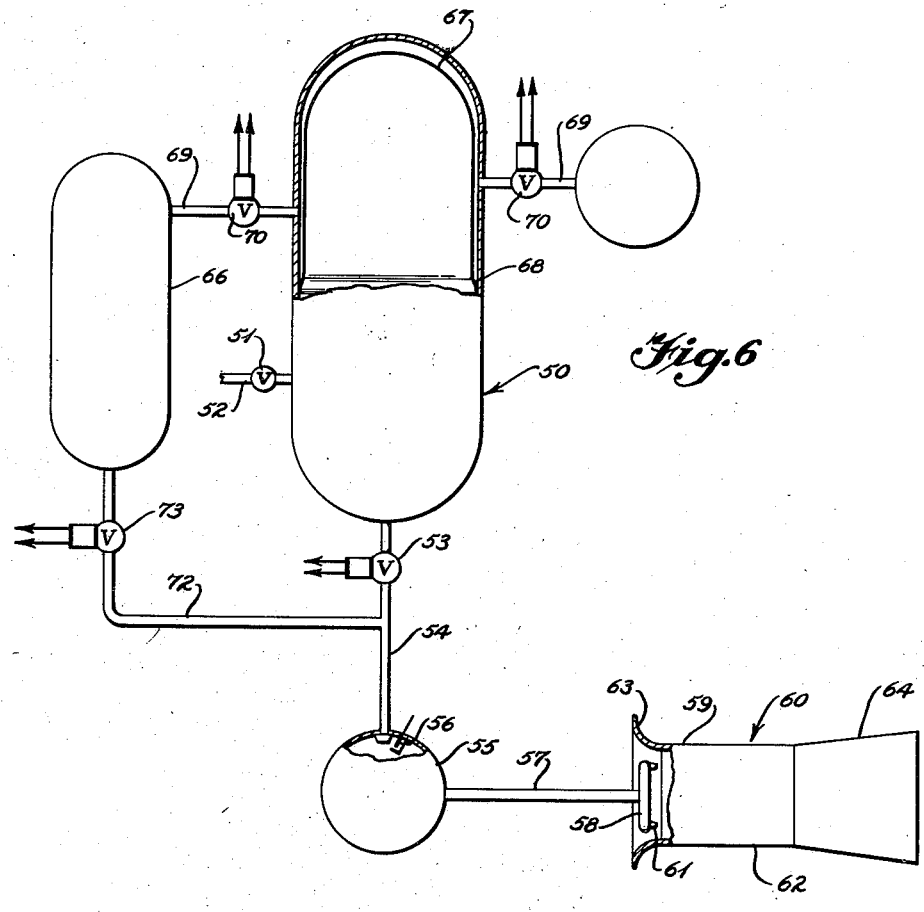
Fig. 6 is a schematic view of the jet pump system including the pressure apparatus.

Referring to Fig. 1 there is disclosed an airplane wing 10 supported from the fuselage 11 by ribs 12a, 12b, and 12c. On the trailing edge of the wing between the tip 13 and fuselage are positioned three flaps, the aileron 14, the blow flap 15 and the suction flap 16. These flaps are all pivoted to the wing, the suction flap by a piano hinge 17 to the lower wing side 18 (Figs. 2, 3), and the blow and aileron flaps by bracket 38 extending from the base wing edge 18 to a pivot point 42 on the flap positioned toward the base 20 of the flap. This hinge arrangement permits substantial closure of the gap 21 when the flap is in neutral position, as shown in Fig. 4, and appreciable gap opening when the flap is depressed, as shown in Fig. 5. Between wing ribs 12b and 12c, in the wing interior, ahead of the outer end of the suction flap, is placed a jet pump 25, the inner or suction pump end being supplied with pressure gas through pipe 26 and plural nozzles 27.

Reference is now made to Figs. 2–5 in conjunction with Fig. 1 for a description of the air flow induced by the jet pump 25. When the suction flap is up, the upper surface of gap 30 is closed and normally the pump 25 is inactive. In the flap-down position of Fig. 3, the gap 30 is open due to the lower hinge 17, and the shape of the edge portions of the gap. As shown, the trailing flap edge is centrally depressed with the depressed section normally meeting the upper side wing lip 31 of the top side 32, and the lower edge meeting the lower side wing lip when the flap is in up or neutral position, forming a constricted duct to the wing interior 34 when in open position. Thus, in open position with the pump operating, air is drawn through the slot thereby lowering the air pressure on the wing surface and consequently increasing the lift coefficient and reducing the separating tendency of the boundary layer.

The hinged joints of the blow flap and aileron, illustrated in Figs. 4 and 5, differ over the suction flap joint in that a bracket 38 projects rearwardly from the lower trailing edge 39 of the wing; and to the bracket end a second bracket 19, depending from the lower leading flap edge 41, is connected by pivot 42. In this manner, in conjunction with the upwardly and outwardly inclined and teardrop shaped lower lip 40, a single outlet duct is provided for air out-blow when the flap is up, air moving between the lower lip 40 and upper wing side 32 and between side 32 and over the leading flap edge 41; and dual air flow ducts when the flap is down, air moving from the wing interior through the lower lip top side duct and also, by suction, between the lip and the flap leading edge through channel 44, the air moving over the leading edge of the flap. Thus, both in the neutral ailerons and in the depending blow flaps when the jet pump is operating the pressure is markedly reduced at the trailing side of the hinge gap thereby insuring pressure reduction on the wing top and substantial increase in lift coefficient and decrease in drag coefficient. It is pointed out that the dual gap air flow of Fig. 5 serves to increase the effective gas flow mass and consequently increase the lift coefficient.

The slotted flap configuration for blowing is desirable because of the higher maximum coefficient of lift of this configuration over the plain flap.

In use, when increased lift is needed for take-off or landing, the pump is energized and the blow and suction flaps lowered. The normal flap action and the resultant reduction of pressure on the upper airfoil surface increases the lift, while stabilizing the boundary layer tends to decrease the profile drag.

The apparatus described would fail to accomplish the desired results unless the jet pump possessed ample power, and could be used without danger to the aircraft and aircraft occupants. After considerable research it has been found that ethylene oxide may be effectively employed as a power source. This ether undergoes thermal decomposition with large evolution of energy according to the following equation:

$$C_2H_4O \rightarrow CO + CH_4 + 1065 \text{ B.t.u./lb.}$$

where B.t.u.=British thermal units.

A glow plug or an appropriate catalyst placed in the decomposition chamber is sufficient to initiate decomposition of this chemical, the decomposition products becoming high pressure gases suitable for effective use in the jet pump. The properties of ethylene oxide are excellent for boundary control used on airplane, the freezing point, being −111° C. and the viscosity low being at 80° C. Toxicity and corrosiveness are also both low and there is low sensitivity to mechanical and thermal shock.

In Fig. 6 is illustrated a specific arrangement for utilization of ethylene oxide in a jet pump. The ethylene oxide tank is indicated by numeral 50, with a manual supply valve 51 in inlet pipe 52 and an electrical valve 53 in outlet pipe 54. The pipe 54 connects to the gas generator tank 55, which, as shown, is provided with a glow plug 56 to initiate the gas decomposition. Decomposition gases are led by duct 57 to the manifold 58 placed in the rear end of the tubular casing 59 of jet pump 60, transversely of the axis thereof. Nozzles 61 spaced around the manifold periphery, direct the gases through the jet pump, with its constricted central section 62, curvilinear flaring inlet section 63 and uniformly divergent outlet section 64.

Pressure for forcing the ethylene oxide from tank 50 to decomposition tank 55 and for insuring adequate initial gas pressure prior to decomposition may be supplied by a high pressure pump inserted in the connecting duct 54. However, since the time intervals involved in take-off and landing are short (a total of about two minutes) and since higher weights are involved, preference in the pressure means is given to the use of a high pressure nitrogen tank 66, combined with a rubberized gas-impervious diaphragm 67 of cup shape inserted inside the tank 50 with its edge 68 sealed to the central inner wall and the body extending toward the outer tank end away from the outlet pipe 54. A pipe 69, with an electrical valve 70, connects the nitrogen tank 66 to the space in tank 50 between the diaphragm and the tank wall.

It is desirable after use of the apparatus to purge the tank 55 of decomposition gases and provide an inert atmosphere therein before injection of untreated ethylene oxide. To accomplish this result a pipe 72 is connected to pipe 69 at a point between the valve 70 and nitrogen tank 66 and extended to pipe 54 at a point between valve 53 and tank 55, thus by-passing the ethylene oxide tank. An electric valve 73 is placed in pipe 72.

On operation of the apparatus, the tank 55 is preferably purged by opening the valve 73, valves 53 and 70 being closed. Valve 73 is then closed and valve 70 opened applying pressure (about 500 pounds per square inch) to the diaphragm 67 of tank 50. Glow plug 56 is then energized and valve 53 is opened, filling the decomposition tank with high pressured ethylene oxide. At the initial low pressure of the incoming ethylene oxide, the glow plug decomposes a small amount of gas according to the equation $$C_2H_4O \rightarrow CO + CH_4 + 1065 \text{ B.t.u./lb.}$$

This is an exothermic reaction and the decomposition proceeds rapidly with progressively increasing pressures, the limit pressure value lying between five and thirty atmospheres per square inch as desired. The operator employs valve 53 for control. The decomposition step occurs in a time period of less than one second. The high pressure gas emitted from nozzles 61 in the jet pump induces a large parallel flow of external air which, aided by the Venturi type construction of the pump, flows at high speed therethrough, thus supplying suction at the inlet end and pressure at the outlet end for application to the suction and blow flaps and ailerons.

It is pointed out that the decomposition products of ethylene oxide are carbon monoxide and methane, each being a combustible gas; consequently, by minor modification of the described apparatus of Fig. 6, including supply of oxygen, additional pressures may be derived from the initial gas through combustion according to the equation.

$$CO + CH_4 + 2\tfrac{1}{2} O_2 \rightarrow 2CO_2 + 2H_2O$$

Figure 7:
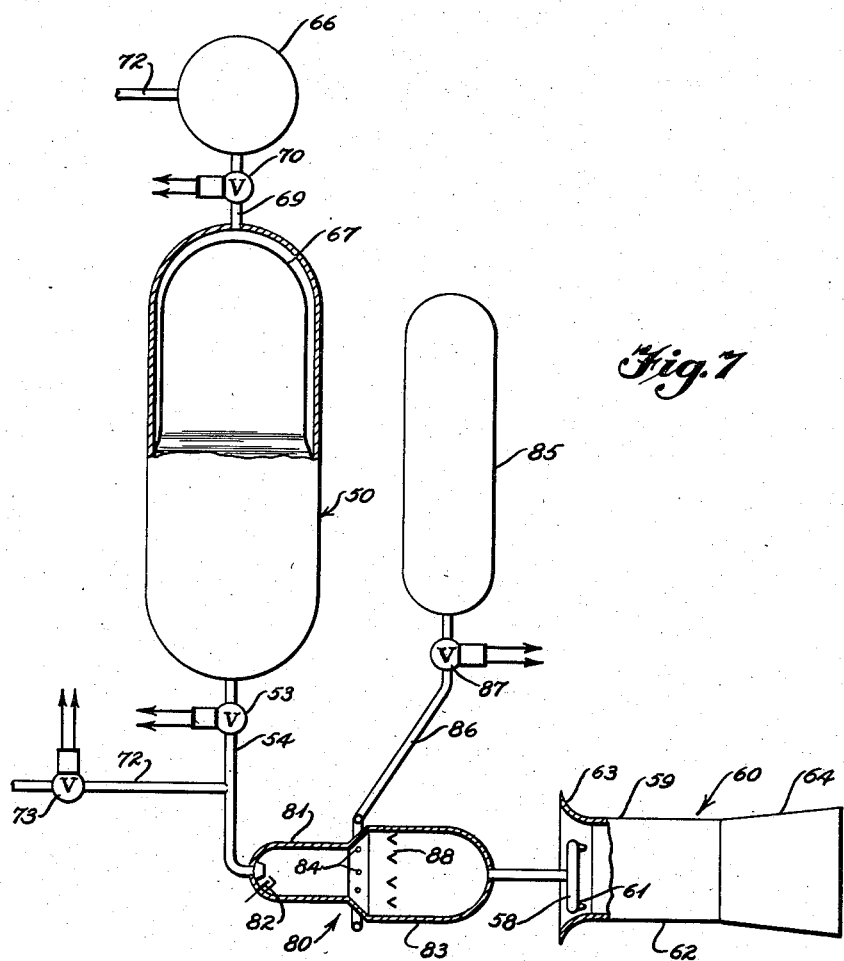
Fig. 7 illustrates the jet pump system including the gas burner.

In terms of energy, the heat available from such burning is 10,635 B.t.u./lb. as compared to 1065 for decomposition only. Such modification is shown in Fig. 7, where the ethylene oxide tank 50, the nitrogen tank 66, the purge supply by-pass pipe 72 and connecting pipes and valves are the same as in the Fig. 6 disclosure. In place, however, of the decomposition tank 55 of Fig. 6, use is made of a combined unit 80 including the decomposition chamber section 81 with the glow plug 82 and the serially adjoining combustion chamber section 83. At the junction of the two chambers 81 and 83 there is provided a series of annular oxygen inlets 84 connected to a manifold which, in turn, has connection to the oxygen tank 85 through pipe 86 and electric valve 87. The oxygen is directed through the flame holder 88, with the combustible decomposition gases, and the mixture burns in chamber 83.

In operating the modified system of Fig. 7 the decomposition combustion tank is first purged by opening valve 73 in by-pass pipe 72. The glow plug 82 is then energized and valve 70 opened to permit compression of the ethylene oxide by the nitrogen. Valves 53 and 87 are then simultaneously opened permitting flow of ethylene oxide into the decomposition chamber and oxygen and decomposition gases into the combustion chamber 83 where they are burned, the highly heated gases at magnified velocity and pressure flowing outwardly through the jet pump nozzles 61. Thus, high pressure, inducing high mass air flow through the jet pump, results from the decomposition combustion reactions. To shut down the system, valves 53, 70 and 87 are closed, and nitrogen is permitted to flow for a few seconds through pipe 72 to purge the decomposition combustion tank and connecting pipe lines.

It is pointed out that when ethylene oxide is employed as hereinabove described, either as a decomposition product only or as a combined decomposition and combustion product, no operational hazards are involved and that the pressures are adequate for effective boundary layer central without excessive increase in weight of necessary apparatus. It is also noted that when valve 70 is closed the diaphragm 67 remains under pressure so as to insure that the ethylene oxide remains liquid and hence of lower volume.

By means of the apparatus as hereinabove described ethylene oxide may be safely and effectively employed as a high gas pressure source for a jet pump, and when the jet pump is applied to control gas flow over trailing suction and blow flaps in air wing construction, fully adequate control over wing circulation and consequently over the lift and drag coefficients is secured.

Obviously, modifications and variations of this invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An aircraft comprising wings with a plurality of trailing edge flaps in combination with a boundary layer control apparatus comprising a passageway in each wing forward of the flaps, a jet pump in said passageway for drawing air by suction over certain of said flaps into said passageway and blowing air from said passageway over other of said flaps, means for rapidly supplying large volumes of fluid to the pump independently of the propulsive power of the aircraft including a tank, an elastic member within said tank forming a flexible chamber for holding decomposable gas, an inlet in said tank, an outlet in said flexible chamber, pressure means connected to the tank inlet for applying pressure to the outer surface of said flexible chamber whereby gas in said chamber may be forceably ejected through the chamber outlet, a receptacle comprising a substantially closed vessel having a relatively small inlet and a relatively small outlet, first conducting means for conducting a decomposable gas from the chamber outlet to said receptacle through said small inlet, means in said receptacle for initiating decomposition of said gas, said decomposition means comprising a glow plug, a nozzle for supplying decomposed gases to the pump, second conducting means for conducting decomposed gases from said receptacle through said small outlet to said nozzle, and valve means in said first and second conducting means for controlling the flow of gases into and out of said receptacle.

2. An aircraft comprising wings with a plurality of trailing edge flaps in combination with a boundary layer control apparatus comprising a passageway in each wing forward of the flaps, a jet pump in said passageway for drawing air by suction over certain of said flaps into said passageway and blowing air from said passageway over other of said flaps, means for rapidly supplying large volumes of fluid to the pump independently of the propulsive power of the aircraft including a tank for holding a decomposable gas, pressure means for rapidly ejecting a decomposable gas from said tank, a decomposition receptacle, conducting means between said tank and said receptacle for conducting a decomposable gas from said tank to said receptacle, means including a glow plug for initiating decomposition of said gas in said receptacle, burning means comprising a furnace in series extension with said receptacle, at least one oxygen nozzle opening into said furnace, a source of oxygen, a conduit for conveying the oxygen to said oxygen nozzle and furnace, valve means for controlling the flow of oxygen through said nozzle and a flame holder mounted in said furnace for controlling the flame direction in said furnace, an outlet in said furnace, a nozzle for supplying the decomposed and burned gases to the jet pump and a conduit between the furnace outlet and supply nozzle.

References Cited in the file of this patent
UNITED STATES PATENTS

| | | |
|---|---|---|
| 1,208,407 | Tillner | Dec. 12, 1916 |
| 2,211,871 | Wagner | Aug. 20, 1940 |
| 2,270,920 | Backhaus | Jan. 27, 1942 |
| 2,465,464 | Meyer | Mar. 29, 1949 |
| 2,517,524 | Beck | Aug. 1, 1950 |
| 2,523,656 | Goddard | Sept. 26, 1950 |
| 2,585,676 | Poisson-Quinton | Feb. 12, 1952 |
| 2,612,019 | Halford | Sept. 30, 1952 |
| 2,655,786 | Carr | Oct. 20, 1953 |

FOREIGN PATENTS

| | | |
|---|---|---|
| 435,653 | France | Mar. 7, 1912 |
| 154,254 | Great Britain | Nov. 22, 1920 |
| 53,327 | Netherlands | Oct. 15, 1942 |

OTHER REFERENCES

Western Aviation (mag.), vol. 32, issue 12, page 34, December 1952.

Jet Propulsion Journal of the American Rocket Society, vol. 24, No. 2, March-April 1954, article by Robison, pages 111 and 112.

Industrial and Engineering Chemistry, vol. 42, No. 6, June 1950, article by Kess and Tilton, pages 1251–1258.